United States Patent
Harris

(10) Patent No.: US 7,690,523 B2
(45) Date of Patent: Apr. 6, 2010

(54) BOTTLED FOOD BASKET

(76) Inventor: Robert E. Harris, P.O. Box 655, Acton, CA (US) 93510

( * ) Notice: Subject to any disclaimer, the term of this patent is extended or adjusted under 35 U.S.C. 154(b) by 765 days.

(21) Appl. No.: 11/557,610

(22) Filed: Nov. 8, 2006

(65) Prior Publication Data

US 2008/0105697 A1    May 8, 2008

(51) Int. Cl.
B65D 25/06    (2006.01)
B65D 25/08    (2006.01)
B65D 25/38    (2006.01)

(52) U.S. Cl. .................. 220/23.89; 215/231; 220/501; 220/735

(58) Field of Classification Search .......... 220/735, 220/23.89, 23.83, 501, 218, 579; 215/231; 99/297, 287, 495
See application file for complete search history.

(56) References Cited

U.S. PATENT DOCUMENTS

| | | | |
|---|---|---|---|
| 522,693 A | 7/1894 | McLaughlin | |
| 642,262 A | 1/1900 | Sarles | |
| 1,342,321 A * | 6/1920 | Beler | 215/231 |
| 2,712,668 A * | 7/1955 | Thiele | 15/264 |
| 2,900,896 A | 8/1959 | Bondanini | |
| 3,004,657 A | 10/1961 | Hyman | |
| 3,363,794 A | 1/1968 | Dearing | |
| 3,380,592 A | 4/1968 | Arnold | |
| 4,427,125 A * | 1/1984 | Tuitt | 215/231 |
| 5,048,305 A * | 9/1991 | Taub | 62/372 |
| 5,634,569 A | 6/1997 | DeCoster | |
| 5,868,266 A | 2/1999 | Nobakht | |
| 5,887,510 A * | 3/1999 | Porter | 99/287 |
| 6,036,038 A | 3/2000 | Lovelace et al. | |
| 6,398,051 B1 * | 6/2002 | Brozell et al. | 215/231 |
| 7,040,218 B1 * | 5/2006 | Biolchini, Jr. | 99/297 |
| 7,093,531 B2 * | 8/2006 | Tardif | 99/297 |
| 7,544,294 B2 * | 6/2009 | Halterman | 210/232 |
| 2002/0185463 A1 * | 12/2002 | Arai | 215/231 |
| 2007/0028779 A1 * | 2/2007 | Pigliacampo et al. | 99/297 |

* cited by examiner

*Primary Examiner*—Anthony Stashick
*Assistant Examiner*—Niki M Eloshway
(74) *Attorney, Agent, or Firm*—Kelly Lowry & Kelley LLP

(57) ABSTRACT

A food storage and retrieval system includes a food storage container and a basket disposed within the container. The basket includes a base and a plurality of wings disposed about a periphery of the base. The wings are pivotally attached to the base and biased to engage an inner surface of the container. An elongated handle is slidable through the base. The handle includes a flange at a lower end thereof for engaging a facing surface of the base to lift the basket within the container, and a key selectively engageable with the base to push the basket downwardly within the container.

16 Claims, 5 Drawing Sheets

BOTTLED FOOD BASKET

BACKGROUND OF THE INVENTION

The present invention relates, in general, to a food packaging system. More particularly, the present invention relates to a food storage and retrieval system.

Attempts have been made to improve the ability to store food within containers and retrieve food from those containers. It is well-known to store small food items, such as pickles, olives, cherries, eggs, pickled onions, marinated vegetables or the like in containers with lids (usually with the food item submerged in a fluid of some kind). However, a conventional lidded container has certain disadvantages. For example, as a product is consumed, the user must be able to reach food that is situated progressively lower and lower within the container. This often requires that a user use his/her fingers or a utensil in order to reach and remove the food from the container. This can result in a user getting their fingers dirty from the brine, juice or whatever fluid is also held within the container. This can also result in contamination of the food due to bacteria being transferred to the food or fluid held within the container by the fingers/utensil used to retrieve some of the food. Contamination of the food can result in serious health consequences.

Various attempts have been made to overcome the problems associated with conventional containers. For example, U.S. Pat. No. 522,693 discloses an elevating device for bottles. However, the basket of the device can not remain near the top of the bottle while the lid is on the bottle as the rod prevents the lid from being placed on the bottle. In another example, U.S. Pat. No. 2,900,896 discloses a coffee filter pot having a handle for lifting and lowering a basket. However, while the basket of this device is able to remain near the top of the container while the lid is on the container, the handle can not be disposed within the container. In an additional example, U.S. Pat. No. 3,380,592 discloses a strainer tray with a central handle. However, the outer diameter of the tray is not able to adapt to variations in the diameter of the container the tray is placed within. In a further example, U.S. Pat. No. 6,036,038 discloses a food packaging system including content lifting insert. However, the device requires the use of additional baskets as the primary basket can not adapt to changing diameters of the container and the handle can not be disengaged from the primary basket.

Accordingly, there is a need for a food storage and retrieval system that provides a basket that can remain near the top of the container without being held by a user. There is a further need for a food storage and retrieval system that provides for a handle that can be disposed entirely within the container while the basket is near the top of the container. There is a need for a food storage and retrieval system that provides for a handle that can be disengaged from the basket. There is also a need for a food storage and retrieval system that provides a basket that can engage the interior surface of the container even as the inner diameter of the container varies between the top and bottom of the container. There is an additional need for a food storage and retrieval system that is simple and economical to manufacture. The present invention fulfills these needs and provides other related advantages.

SUMMARY OF THE INVENTION

The present invention resides in a system designed for contoured and straight-walled containers that provides a way to store and retrieve food from within the containers. As illustrated herein, an embodiment of a food storage and retrieval system includes a food storage container and a basket disposed within the container. The basket includes a base and a plurality of wings disposed about a periphery of the base. The wings are pivotally attached to the base and biased to engage an inner surface of the container. An elongated handle is slidable through the base. The handle includes a flange at a lower end thereof for engaging a facing surface of the base to lift the basket within the container, and a key selectively engageable with the base to push the basket downwardly within the container.

The basket includes a plurality of fluid drainage apertures.

Each wing is attached to the base by a living hinge and each wing pivots to accommodate varying diameters of the container.

The length of the handle approximates the height of the container. The handle is adapted to pivot relative to the base.

The base includes a lock having a keyway through which the key passes to disengage the handle from the base. The lock comprises a key-receiving slot defined by the base through which the key is adapted to pass when aligned with the slot. The key is rotatable between a locked configuration wherein the key engages the base to push the basket downwardly within the container and an unlocked configuration wherein the key is aligned with the slot to pass through the slot while leaving the basket in position within the container.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in FIGS. 1-12 for purposes of illustration, the present invention is concerned with a food storage and retrieval system 20.

An embodiment of a food storage and retrieval system 20 includes a food storage container 22 and a generally concave basket 24.

Figure 1:
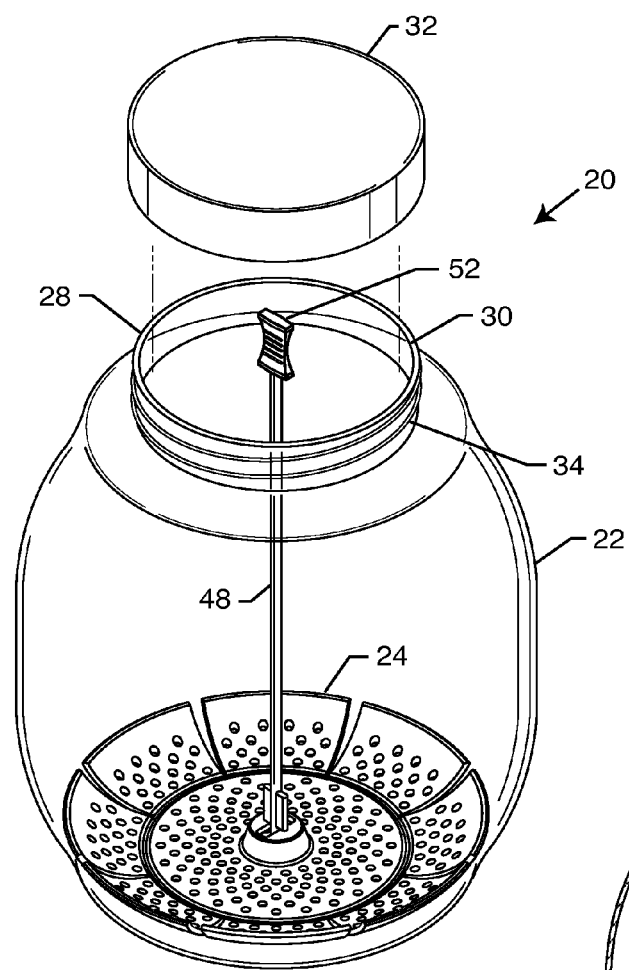
FIG. 1 is a perspective view of a food storage and retrieval system embodying the present invention.
Figure 2:
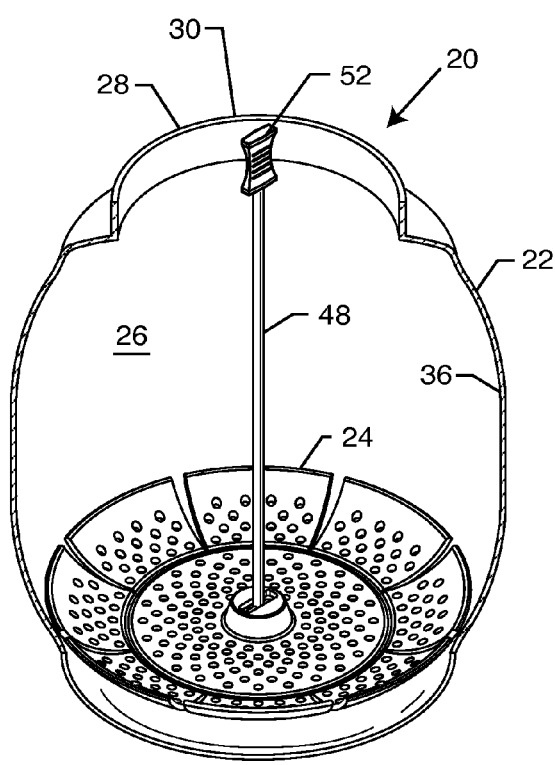
FIG. 2 is a perspective, cross-sectional view of the food storage and retrieval system of FIG. 1 with the basket at the bottom of the container.
Figure 3:
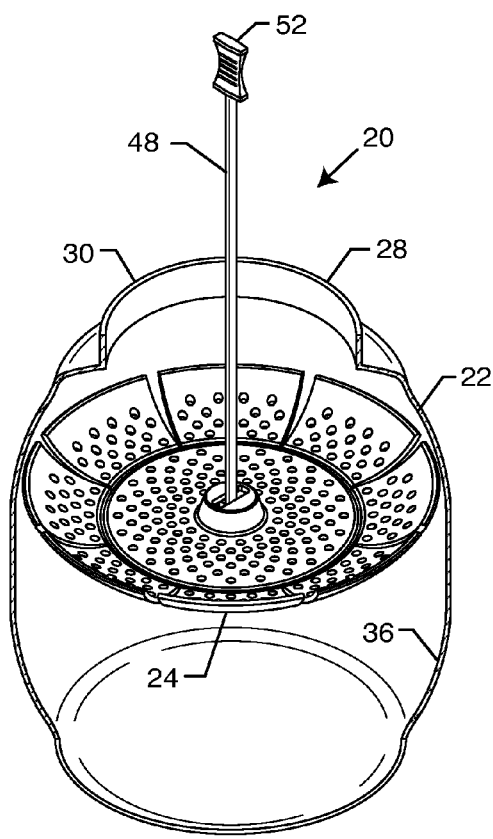
FIG. 3 is a perspective, cross-sectional view of the food storage and retrieval system of FIG. 1 with the basket midway up the container.

The container 22 comes in various forms including, but not limited to, a jar, a bottle or the like. The container 22 may be made of various materials including, but not limited to, glass metal, plastic or the like. The container 22 defines an inner cavity 26 used as a food holding chamber. The container 22 includes an open end 28 that serves as a mouth opening that provides a user access to the inner cavity 26. The basket 24 is disposed within the container 22 such that an open end of the basket 24 faces upwardly towards the open end 28 of the container 22. The open end 28 of the container 22 includes a neck 30 over which a removable closure, cap or lid 32 can be secured. The lid 32 comes in various forms including, without limitation, a screw-on lid (see FIG. 1) having an inner lip (not shown) or threads (not shown) that engage threads 34 on the neck 30 of the container 22, a snap-fit lid or the like. The inner cavity 26 is defined by an inner surface wall 36. A diameter of the inner cavity 26 may be generally constant between the top and bottom of the inner cavity 26 or the diameter of the inner cavity 26 may vary between top and bottom of the inner cavity 26, as seen in FIG. 1. The term "diameter" is used in a general sense in that the cross-sectional shape of the inner cavity 26 can be circular, triangular, rectangular, square, pentagonal, sextagonal, septagonal, octagonal or any other polygonal shape with the "diameter" being the distance between the inner surface wall(s) 36 on opposite sides of the inner cavity 26 as measured through a center of the container 22.

Figure 10:
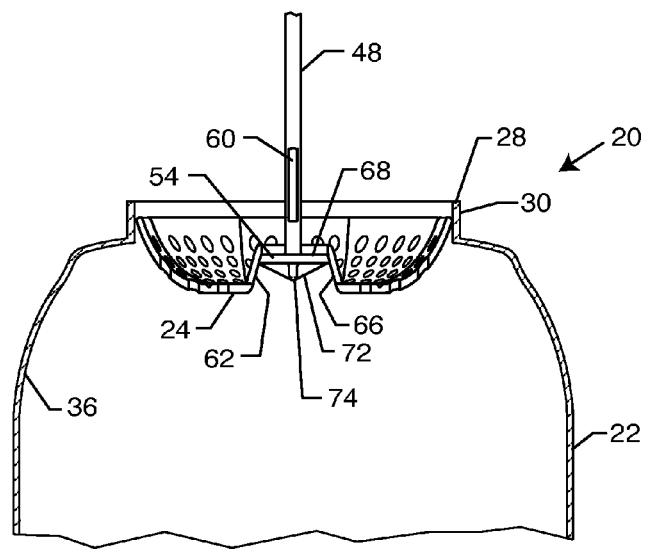
FIG. 10 is a side cross-sectional view illustrating the basket engaging the interior surface of the neck of the container at the top of the container.
Figure 11:
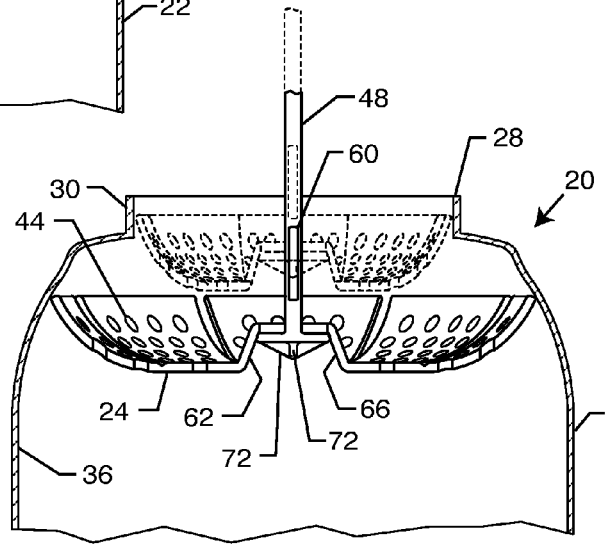
FIG. 11 is a side cross-sectional view illustrating the wings of the basket expanded to engage the interior surface of the container below the neck of the container.
Figure 12:
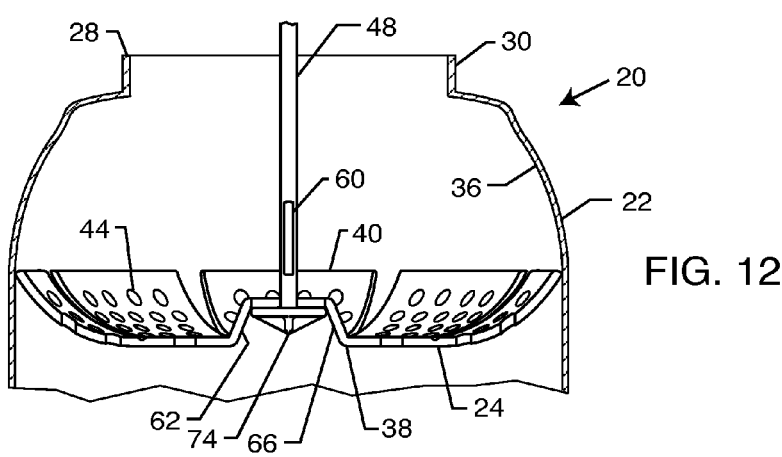
FIG. 12 is a side cross-sectional view illustrating the wings of the basket expanded to engaging the interior surface of the container below that shown in FIG. 11.

The basket 24 includes a base 38 and a plurality of concave-shaped wings 40 disposed about a periphery of the base 38 to provide the basket 24 with the appearance of an upwardly open bowl. At least one set of notches 42 are disposed between adjacent wings 40 for assisting each wing to bend independent of adjacent wings 40. The base 38 and each of the wings 40 include a plurality of fluid drainage apertures 44. The wings 40 are of single-piece construction with the base 38 with each wing 40 pivotally attached to the base 38 by a living hinge 46 and biased to engage the inner surface wall 36 of the container 22 such that the wing 40 pivots to accommodate varying diameters of the container 22 as the basket 24 moves between the top and bottom of the container 22, as seen in FIGS. 10-12. In the alternative, each wing 40 is pivotally connected to the base 38 by a spring-loaded hinge or the like such that each wing 40 is biased to engage the inner surface wall 36 of the container 22 in order to allow the wings 40 to pivot to accommodate varying diameters of the container 22 as the basket 24 moves between the top and bottom of the container 22.

An elongated handle 48 is slidable through the base 38 of the basket 24. The length of the handle 48 is approximately the same and/or less than the height of the container 22 such that the lid 32 can be secured to the container 22 with the handle 48 disposed within the container 22. The handle 48 includes an elongated, generally linear stem 50 having a generally rectangular grip 52 at an upper end and a disk-shaped flange 54 at a lower end thereof, disposed perpendicularly to the stem 50.

Figure 4:
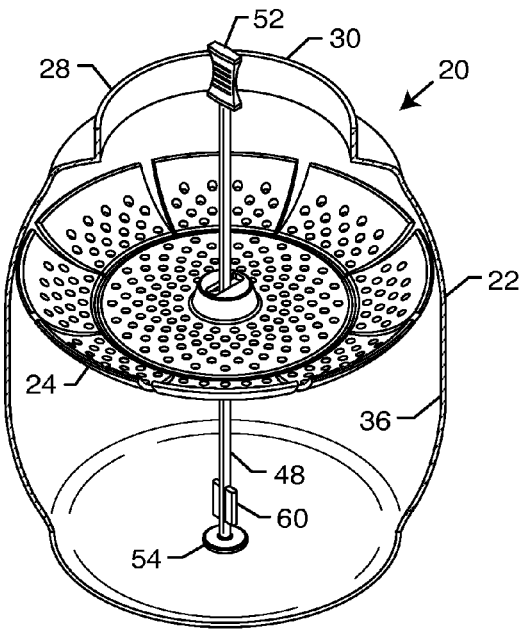
FIG. 4 is the food storage and retrieval system of FIG. 3 with the handle disengaged from the basket.

The base 38 includes a raised central portion 56 forming part of a mechanism for locking 58 the handle 48 and base 38 together. The locking mechanism 58 also allows the handle 48 and the base 38 to be selectively disengaged from each other. The handle 48 includes a stopper tab or key 60 forming another part of the locking mechanism 58 that allows the handle 48 to be selectively engageable with the base 38. Engagement of the handle 48 and the base 38 allows a user to push or pull on the handle 48 in order to, respectively, move the basket 24 upwardly or downwardly within the container 22. The locking mechanism 58 includes a keyway 62 having a key-receiving elongated slot 64 in the central portion 56 through which the key 60 passes in order to disengage the handle 48 from the base 38. The key 60, in the form of two aligned flanges extending from opposite sides of the stem 50, is adapted to pass through the slot 64 when aligned with the slot 64. The stem 50 is no wider than the slot 64 such that the stem 50 is rotatable relative to the base 38 while extending through the slot 64. This allows the key 60 to be rotatable between a locked configuration (FIG. 8) where the key 60 engages the base 38 to push the basket 24 downwardly within the container 22 and an unlocked configuration (FIG. 9) where the key 60 is aligned with the slot 64 to pass through the slot 64 while leaving the basket 24 in a fixed vertical position within the container 22 (FIG. 4). In the unlocked configuration, the basket 24 maintains vertical position within the inner cavity 26 when the basket 24 is disengaged from the handle 48 because the wings 40 allow the basket 24 to constantly engage the inner surface wall 36 of the container 22. Thus, when the handle 48 is in the locked configuration, pushing or pulling on the handle 48 allows the basket 24 to be selectively vertically positioned within the inner cavity 26 of the container 22.

Figure 5:
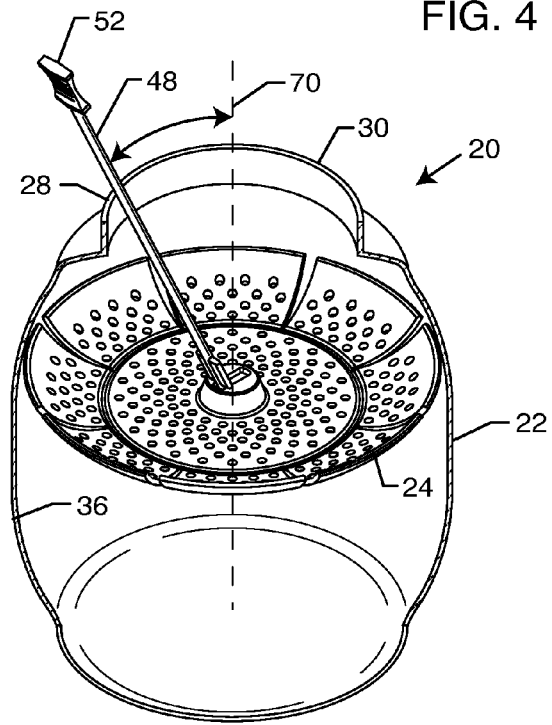
FIG. 5 is the food storage and retrieval system of FIG. 3 with the handle pivoted relative to the basket.
Figure 6:
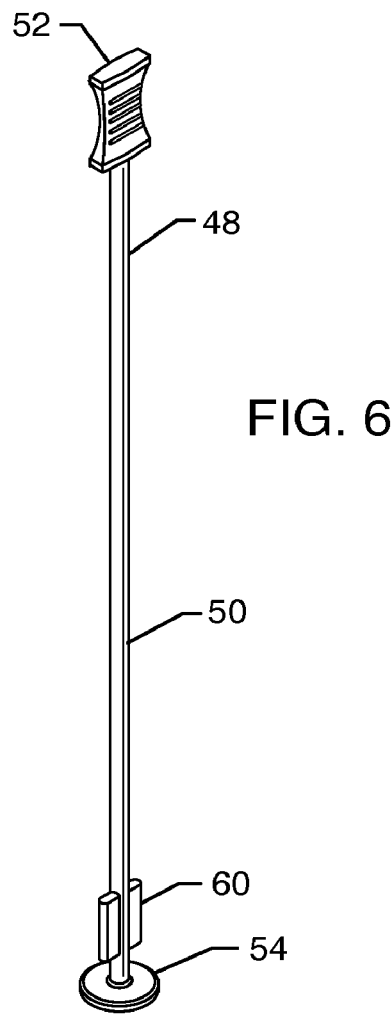
FIG. 6 is a perspective view of the handle.
Figure 7:
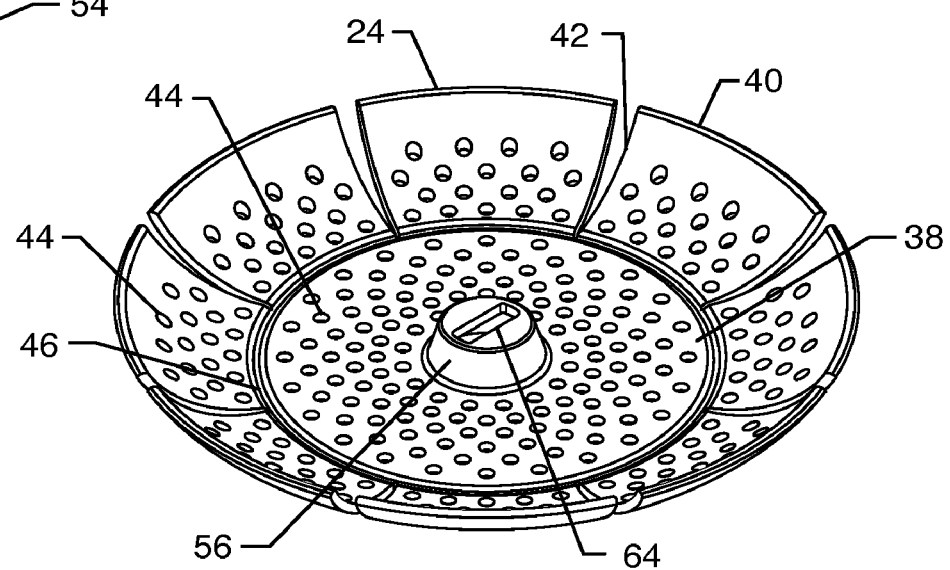
FIG. 7 is a perspective view of the basket.
Figure 8:
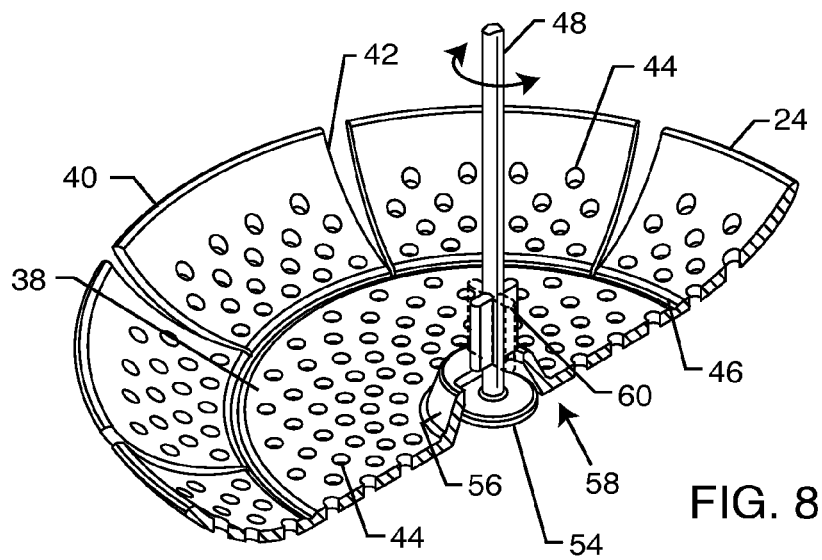
FIG. 8 is a perspective view of the handle and basket illustrating the key rotating between locked and unlocked configurations.
Figure 9:
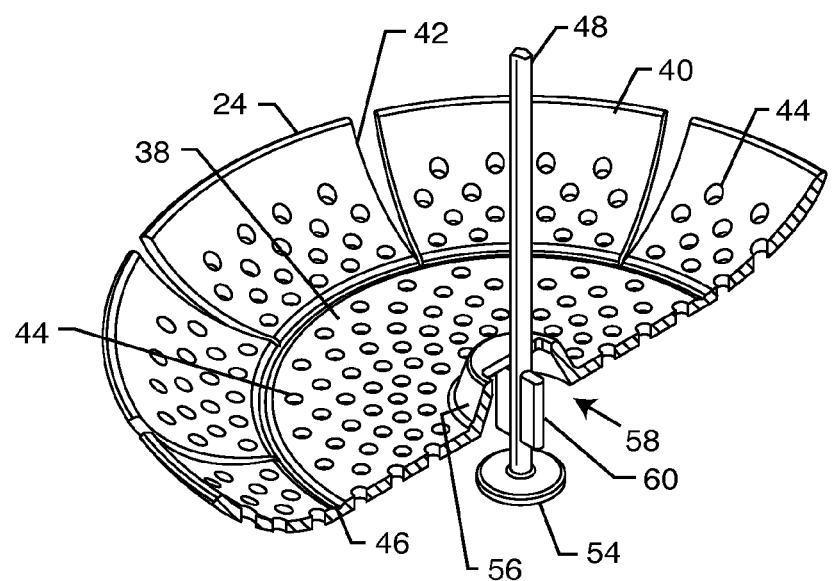
FIG. 9 is a perspective view of the handle and basket illustrating the key having passed through the basket.

The central portion 56 defines a recess 66 open towards a bottom of the container 22 within which the flange 54 is positionable to engage a facing surface 68 of the central portion 56 such that the basket 24 is vertically lifted in a generally even manner within the container 22 when the container 22 is sitting on a generally horizontal surface with the open end 28 of the container 22 facing upwardly. The flange 54 of the handle 48 is too wide to pass through the slot 64 so the handle 48 can only be completely disengaged from the basket 24 by sliding the handle 48 entirely through the slot 64 with the grip 52 being small enough to pass through the slot 64. As seen in FIG. 5, even though the locking mechanism 58 engages the handle 48 with the base 38, the handle 48 is adapted to still be able to pivot relative to a vertical axis 70 common to the basket 24 and the container 22 such that a user can pivot the handle 48 towards the side of the neck 30 of the container 22 in order to provide easier reach to an object held within the basket 24 while the basket is still within the container 22 but relatively near the neck 30.

In an alternative embodiment of the flange 54, the flange 54 can include, as seen in FIGS. 10-12, a plurality of ribs 72 on a lower side of the flange 54 that form a point 74 about which the handle 48 can pivot.

The basket 24 is designed to be used with both contoured and straight-walled containers 22. That is, the basket 24 is designed to be used within a container 22 having an inner cavity 26 with a generally constant diameter from top to bottom and within a container 22 having an inner cavity 26 with a diameter that varies between top and bottom. The wings 40 on the sides of the basket 24 touch the inner surface wall(s) 36 of the container 22 so that food or product will not slip past the basket 24. The wings 40 are moveable between open and closed configurations as the basket 24 vertically moves within the inner cavity 26. Even if the diameter of the basket 24 is larger than the diameter of the neck 30 of the container 22, the wings 40 are sufficiently resilient, flexible to allow basket 24 to be inserted through the smaller diameter open end 28 and positioned at or near the bottom of the inner cavity 26 prior to the inner cavity 26 being at least partially filled with food or other objects and fluid.

This allows the user to strain off the fluid as the basket 24 is raised above the level of the fluid. The depth of the basket 24 can be changed depending on the food product and the container 22. The use of the basket 24 allows the user to bring the product towards the open end 28 of the container 22 without having to reach down into the container 22. The basket 24 can also be removed from the container 22 to allow for serving the food directly from the basket 24. This can be a relatively deep basket 24 that is approximately the same length as the container 22. The top of the basket 24 can have a molded tip for easier gripping. The food or products that could be placed within the basket 24 include, but are not limited to, artichoke hearts, olives, miniature onions, eggs, hot peppers, cherries, peanuts, fruit, pineapple, pickles, nuts of all types or the like. The apertures 44 in the basket 24 allow any fluid that the food or product is soaking in to drain away from the basket 24 as the basket 24 is lifted upwardly within the container 22, allowing the fluid to remain within the container 22. The basket 24 can also be used to hold various other objects such as jewelry that is soaking in a container 22 holding cleaning solution. The basket 24 can also be used to hold various objects that are to be submerged within a container 22 holding lubricating fluid, cleaning fluid or the like. The basket 24 can also be used to hold food that is to be marinated within a container 22 holding marinade.

In use, a handle 48 is engaged with a basket 24 by sliding the grip 52, stem 50 and key 60 into the recess 66 and through the slot 64 of the base 38 until the flange 54 engages the facing surface 68 of the base 38 within the recess 66. The handle 48 is then rotated so that the key 60 is no longer aligned with the slot 64 that the key 60 is able to pass through the slot 64. The basket 24 is then positioned over the open end 28 of the container 22 in order to dispose the basket 24 within the container 22 such that an open end of the basket 24 faces upwardly towards the open end 28 of the container 22. The wings 40 are sufficiently resilient, flexible to allow the basket 24 to be the open end 28 even if the diameter of the neck 30 is smaller than the diameter of the basket 24. The basket 24 is positioned at or near the bottom of the inner cavity 26. The ends of the wings 40 of the basket 24 engage the inner surface wall 36 of the container 22 as the basket 24 is lowered within the container 22. The wings 40 open and close to adjust to the contours of the inner surface wall 36, as seen in FIGS. 10-12. The inner cavity 26 is then at least partially filled with food or other objects and fluid, and the lid 32 is placed over the open end 28 to close the container 22. The handle 48 fits comfortably within the container 22 even with the lid 32 covering the open end 28.

If a user desires to remove some of the food from the basket 24, the user removes the lid 32 from the container 22 and, with their fingers on the grip 52 of the handle 48, pulls the handle 48 towards them and at least partially through the open end 28 of the container 22. This lifts the basket 24 within the inner cavity 26 towards the open end 28. As the basket 24 is raised above the level of fluid within the container 22, the fluid drains through the apertures 44 of the basket 24. As the basket 24 is lifted, once again the ends of the wings 40 engage the inner surface wall 36 of the container 22 with the wings 40 opening and closing to adjust to the contours of the inner surface wall 36. When the food in the basket 24 is within reach of fingers or a utensil that can grab, grasp, spear or otherwise engage the food to remove the food from the basket 24, the user stops pulling the handle 48 which stops the upward vertical movement of the basket 24. The user could choose to completely remove the basket 24 from the container 22 if they so desired. The wings 40 engage the inner surface wall 36 strongly enough to prevent the basket 24 from sinking back further down into the container 22 from the weight of the handle 48, basket 24 and food. The handle 48 can be pivoted, as seen in FIG. 5, while still engaging the basket 24 in order to provide more room for fingers and/or a utensil to access the food in the basket 24. The handle 48 can also be disengaged from the basket 24 by unlocking the handle 48 from the basket 24 in the manner described above and letting the handle 48 slide downward into the container 22, as seen in FIG. 4, in order to provide more room for fingers and/or a utensil to access the food in the basket 24, and allow the user to place the lid 32 back on the container 22 while leaving the basket 24 in position near the neck 30 of the container 22 for later access to the food held therein. The user can later, remove the lid 32, re-engage the handle 48 with the basket 24, push the handle 48 into the container 22 to lower the basket 24 (as well as the food held therein) until submerged within the fluid, and then replace the lid 32 over the open end 28 of the container 22 for storage of the container 22 until future use.

In the alternative, the handle 48 may include one or more bends along the length of the stem 50 so that the handle 48 still passes through the central portion 56 of the base 38 while the rest of the handle 48 is angled, offset from the vertical axis 70 such that the stem 50 is closer to the side of the neck 30 of the container 22 in order to allow a user easier access to the food or product within the basket 24. In another alternative, the wings 40 may be in the shape of overlapping blades that open and close relative to the base 38 in a manner similar to those found in a vegetable steamer.

All features discussed above can be mixed and matched to define an embodiment that is not directly illustrated in the accompanying figures.

The above-described embodiment of the present invention is illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A food storage and retrieval system, comprising:
   a food storage container;
   a basket disposed within the container, the basket comprising a base and a plurality of wings disposed about a periphery of the base, wherein the wings are pivotally attached to the base and biased to engage an inner surface of the container; and
   an elongated handle slidable through the base, the handle including a flange at a lower end thereof for engaging a facing surface of the base to lift the basket within the container, and a key selectively engageable with the base to push the basket downwardly within the container;
   wherein the base includes a lock having a keyway through which the key passes to disengage the handle from the base; and
   wherein the lock comprises a key-receiving slot defined by the base through which the key is adapted to pass when aligned with the slot.

2. The storage and retrieval system of claim 1, wherein the basket includes a plurality of fluid drainage apertures.

3. The storage and retrieval system of claim 1, wherein each wing is attached to the base by a living hinge.

4. The storage and retrieval system of claim 1, wherein each wing pivots to accommodate varying diameters of the container.

5. The storage and retrieval system of claim 1, wherein length of the handle approximates the height of the container.

6. The storage and retrieval system of claim 1, wherein the key is rotatable between a locked configuration wherein the key engages the base to push the basket downwardly within the container and an unlocked configuration wherein the key is aligned with the slot to pass through the slot while leaving the basket in position within the container.

7. The storage and retrieval system of claim 1, wherein the handle is adapted to pivot relative to the base.

8. A food storage and retrieval system, comprising:
   a food storage container;
   a basket disposed within the container, the basket comprising a base and a plurality of wings disposed about a periphery of the base, wherein the wings are pivotally attached to the base by a living hinge and biased to engage an inner surface of the container; and
   an elongated handle slidable through the base, the handle including a flange at a lower end thereof for engaging a facing surface of the base to lift the basket within the container, and a key selectively engageable with the base to push the basket downwardly within the container;
   wherein the base includes a lock having a keyway through which the key passes to disengage the handle from the base;
   wherein the lock comprises a key-receiving slot defined by the base through which the key passes when aligned with the slot; the key being rotatable between a locked configuration wherein the key engages the base to push the basket downwardly within the container and an unlocked configuration wherein the key is aligned with the slot to pass through the slot while leaving the basket in position within the container.

9. The storage and retrieval system of claim 8, wherein the basket includes a plurality of fluid drainage apertures.

10. The storage and retrieval system of claim 8, wherein each wing pivots to accommodate varying diameters of the container.

11. The storage and retrieval system of claim 8, wherein length of the handle approximates the height of the container.

12. The storage and retrieval system of claim 8, wherein the handle is adapted to pivot relative to the base.

13. A food storage and retrieval system, comprising:
   a food storage container;
   a basket disposed within the container, the basket comprising a base, a plurality of wings disposed about a periphery of the base and a plurality of fluid drainage apertures, wherein the wings are pivotally attached to the base and biased to engage an inner surface of the container; and
   an elongated handle slidable through the base, the handle including a flange at a lower end thereof for engaging a facing surface of the base to lift the basket within the container, and a key selectively engageable with the base to push the basket downwardly within the container; wherein each wing pivots to accommodate varying diameters of the container and the base includes a lock having a keyway through which the key passes to disengage the handle from the base;
   wherein the lock comprises a key-receiving slot defined by the base through which the key passes when aligned with the slot; the key being rotatable between a locked configuration wherein the key engages the base to push the basket downwardly within the container and an unlocked configuration wherein the key is aligned with the slot to pass through the slot while leaving the basket in position within the container.

14. The storage and retrieval system of claim 13, wherein each wing is attached to the base by a living hinge.

15. The storage and retrieval system of claim 13, wherein length of the handle approximates the height of the container.

16. The storage and retrieval system of claim 13, wherein the handle is adapted to pivot relative to the base.

\* \* \* \* \*